UNITED STATES PATENT OFFICE.

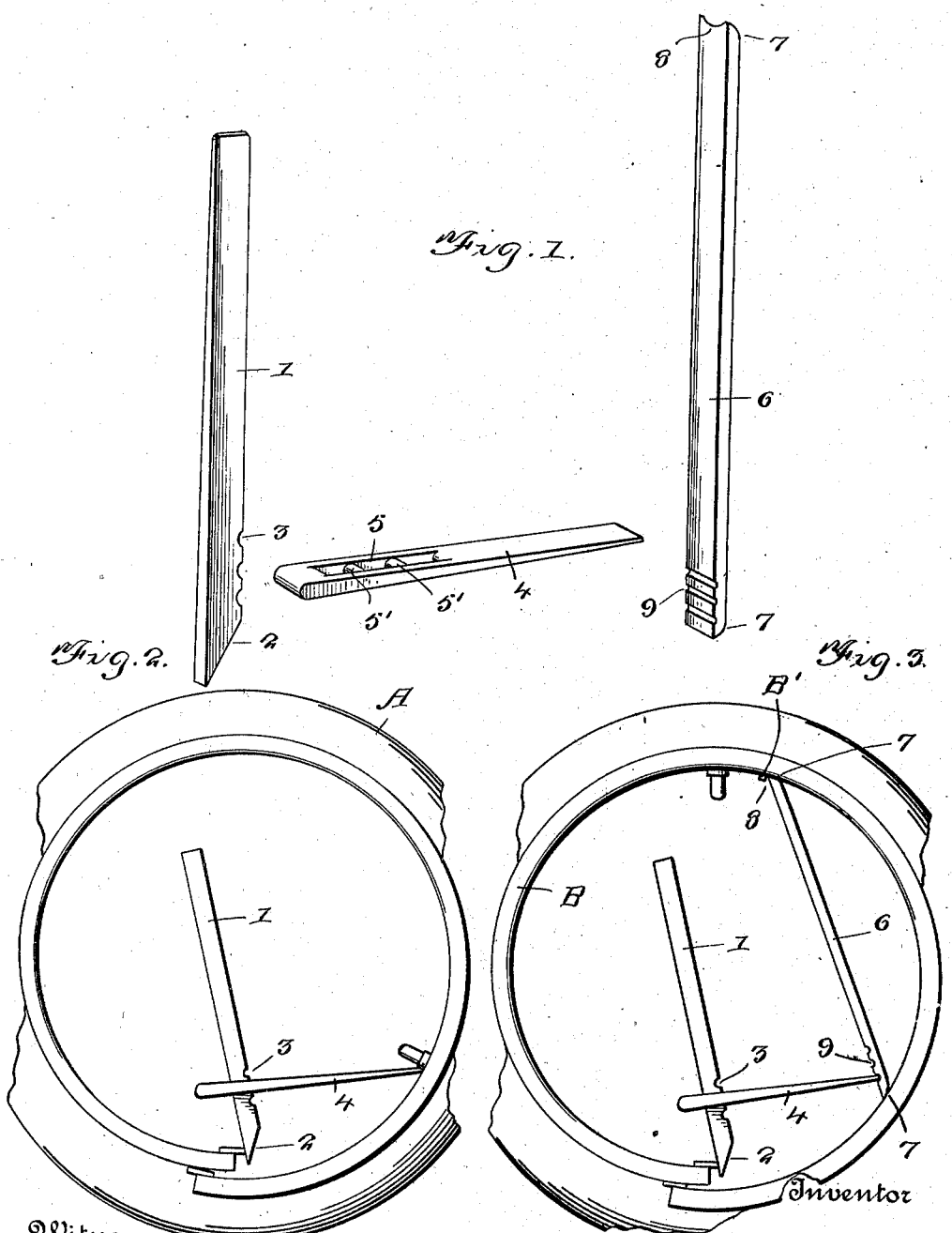

CHARLES W. KEENUM, OF TUCSON, ARIZONA.

TIRE-TOOL.

1,290,227.　　　　　　Specification of Letters Patent.　　Patented Jan. 7, 1919.

Application filed July 22, 1918.　Serial No. 246,062.

*To all whom it may concern:*

Be it known that I, CHARLES W. KEENUM, a citizen of the United States, residing at Tucson, in the county of Pima and State of Arizona, have invented new and useful Improvements in Tire-Tools, of which the following is a specification.

This invention relates to new and useful improvements in rim tools and the principal object of the invention is to provide means for expanding the well known form of split metal rim used to hold the tire on the wheel rim.

Another object of the invention is to provide a device comprising a number of separate and distinct parts, which may be used in combination with each other, or separately.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective view of the three members forming the tool.

Fig. 2 is a front view showing the manner of using the tool on one form of rim.

Fig. 3 is a like view showing the manner of using the three members of the tool on another form of rim.

As shown in these views the invention consists of the lever 1 having its lower end beveled to provide a point 2 and immediately above this pointed end is provided a series of grooves 3 in one edge of the lever. The sides of the lever taper from the pointed end toward the other end so that the said other end may be used as a tire tool. 4 indicates a fulcrum bar which is of tapered formation as shown and adjacent its thick end is provided with a series of slots or holes 5 spaced apart to leave cross pieces 5'. As shown these cross pieces and the outer walls of the end slots are rounded so as to engage the grooves 3 in the lever when said lever is placed in the slots. 6 indicates a rest bar which has both ends slightly rounded as at 7, and one end is provided with a groove 8 for a purpose to be hereinafter fully described.

Adjacent the other end of said bar is located a plurality of small grooves 9 which are adapted to receive the small end of the bar 4.

When the device is used to expand a tire such as that shown at A in Fig. 2 where the opening for the stem of the inner tube is located a slight distance from the split ends of the rim, the lever 1 and bar 4 are used, the bar 6 being omitted. The pointed end of the lever is placed against one of the ends of the rim, after said pointed end is passed through the desired slot 5 in the bar 4. The end of said bar 4 is placed against the stem of the inner tube.

It will thus be seen that by operating the lever 1 the rim will be expanded until the two ends thereof spring together.

When the device is used on a rim such as B shown in Fig. 3 all three parts are used. In this case the rest bar 6 is placed with the groove 8 against the lug B' formed on the rim and its other end engaging said rim at a point where the end of the bar 4 may conveniently engage one of the grooves 9 in said bar 6. In other respects the operation will be the same as that just described. The small end of the bar 4 may be made sharp enough to act as a screw driver where the rim is provided with a screw head to lock them in position. By having the plurality of slots 5 in the said bar the parts may be adjusted to accommodate different sizes of rims.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a lever having a pointed end and a plurality of grooves in one edge adjacent said end, a fulcrum bar having a plurality of slots therein for receiving said pointed end and its other end sharpened, and a rest bar having its ends rounded and one end provided with a groove and its other end with a plurality of small grooves in one edge.

In testimony whereof I affix my signature.

CHARLES W. KEENUM.